United States Patent [19]

Tanaka

[11] Patent Number: 5,069,088
[45] Date of Patent: Dec. 3, 1991

[54] LINEAR MOTION BALL BEARING

[75] Inventor: Kazuhiko Tanaka, Fuchu, Japan

[73] Assignee: Nippon Thompson, Co., Ltd., Tokyo, Japan

[21] Appl. No.: 478,561

[22] Filed: Feb. 12, 1990

[30] Foreign Application Priority Data

Oct. 13, 1989 [JP] Japan .............................. 1-119250[U]

[51] Int. Cl.⁵ .............................................. F16H 49/00
[52] U.S. Cl. ............................... 74/89.15; 74/424.8 R; 74/458
[58] Field of Search ............... 74/89.15, 424.8 R, 458, 74/459

[56] References Cited

U.S. PATENT DOCUMENTS

| | | | |
|---|---|---|---|
| 2,833,156 | 5/1958 | Spontelli | 74/459 |
| 2,833,157 | 5/1958 | Gates | 74/459 |
| 3,902,377 | 9/1975 | Lemor | 74/459 |
| 3,961,541 | 6/1976 | Fund et al. | 74/459 |
| 4,226,137 | 10/1980 | Sharp | 74/459 X |

FOREIGN PATENT DOCUMENTS

| | | | |
|---|---|---|---|
| 257249 | 3/1988 | European Pat. Off. | 74/424.8 R |
| 63-57956 | 3/1988 | Japan . | |

Primary Examiner—Leslie A. Braun
Assistant Examiner—Scott J. Anchell
Attorney, Agent, or Firm—Rogers & Killeen

[57] ABSTRACT

A ball bearing for effecting endless linear motion comprising an elongated rod-like insert member and an outer sleeve member for receiving it within its longitudinally extending throughbore, with a plurality of balls intervened on the interface between the two members so as to effect a smooth relative linear motion thereof along their longitudinal axes.

On and around the peripheral surface of the rod-like insert member is provided a double thread screw track consisting of adjacent first and second spiral grooves having the same pitch but different cross-sectional depths, while on the innerwall surface of the throughbore of the outer sleeve member is formed a double thread screw track consisting of adjacent first and second spiral grooves which are adapted to mate with the adjacent spiral grooves of the rod-like insert member and which with the aid of ball-reversing U-turn passages attached to connect the adjacent grooves of the outer sleeve member, form an endless spiral groove track for circulating the balls on and through the mating spiral grooves of the assembled rod-like insert member.

2 Claims, 2 Drawing Sheets

LINEAR MOTION BALL BEARING

BACKGROUND OF THE INVENTION

1. Field of the Invention

The present invention relates to an improvement in a linear motion ball bearing that finds an extensive utility in not only general machine manufacturing industries but also any other high technological machine industries.

2. Description of the Prior Art

Such a kind of ball bearing as mentioned above is disclosed in Japanese Patent Application Disclosure No. 57956-1988, wherein referring to FIGS. 9 to 11 of said disclosure (corresponding to FIGS. 3 to 5 of the present application), the ball bearing consists of an elongated rod member 4' and a cylindrical outer sleeve member 1' for inserting said elongated rod member 4' therewithin, while on each of the peripheral surface of said rod member 4' and the innerwall surface of said outer sleeve 1' is formed such a double threaded screw groove track with a locas that has been obtained with a loop of strap in the form of an elongated ellipse wound around the peripheral surface of an elongated rod member 4' from one end to the other with the same pitch, so as to form an endless spiral ball circulating track. In the prior art bearing, a double thread screw track is formed on the elongated member 4' consisting of adjacent parallel spiral grooves each having the same cross section and depth, whereas on the innerwall surface of the outer sleeve member 1' is formed a double thread screw track consisting of adjacent parallel spiral grooves each with different cross-sectional depth, one of which provides a groove cross section slightly smaller but the other of which provides a groove slightly greater than a half of the cross section of the ball. Thus, by inserting a plurality of balls between the mating spiral grooves of the outer sleeve member 1' and the elongated rod member 4', the two members can effect a relative linear movement under rotational movement of said elongated rod member 4' within said outer sleeve member 1' due to the bearing action of said balls.

However, the prior art technique encountered a substantial technical difficulty in the formation of a double thread screw track on the innerwall surface of the outer sleeve member 1' as it must provide adjacent parallel spiral grooves with different depths, inevitably accompanying poor dimensional accuracy and defective surface working of the products.

As the result, sliding resistance of balls traveling through the non-load spiral ball returning groove of the bearing becomes greater, which in turn increases sliding resistance of the rod member 4' through the throughbore of the outer sleeve member 1'.

It is an object of the present invention therefore to eliminate the above-mentioned technical disadvantages of the prior art bearing, wherein by simplifying the working required for the formation of double thread screw groove tracks on the innerwall surface of the outer sleeve member and the peripheral surface of the rod-like insert member, yet with high dimensional accuracy and excellent smoothness in worked surface thereof, thereby insuring low cost manufacture of a high-performance ball bearing with the least sliding resistance in operation.

SUMMARY OF THE INVENTION

The present invention is therefore to provide:

1) A ball bearing for effecting endless linear motion comprising an elongated rod-like insert member (4) and an outer sleeve member (1) for receiving, within its longitudinally extending throughbore (2'), said elongated rod-like insert member (4), and a plurality of balls intervened between said elongated rod-like insert member (4) and said outer sleeve member (1) for allowing said two members to effect a free relative linear motion along their longitudinal axes, which is characterized in that said rod-like insert member (4) is provided, on and around its peripheral surface, with a double thread screw track (5) having the same pitch and consisting of a first spiral groove (5-1) having a shallower depth to form a load-bearing ball track and a second spiral groove (5-2) adjacent said first spiral groove (5-1) and having a cross section similar to that of said first spiral groove but having a deeper cross-sectional depth to form non-load ball return passage, said outer sleeve member (1) has, on the inner surface of its longitudinally extending throughbore (2'), a double thread screw track (3) consisting of adjacent parallel, spiral grooves (3-1) (3-2) having the same cross section with the same depth and adapted to mate with the double thread screw track (5) of said rod-like insert member (4) with a ball-reversing U-turn groove (C) connecting the adjacent parallel spiral grooves (3-1) (3-2) at the opposing ends of said double thread screw track (3), thereby forming an endless spiral groove track (E) for circulating the balls, and that while said outer sleeve member (1) and said rod-like insert member (4) are making a relative linear motion with each other, the balls are being circulated through said endless spiral groove track (E), traveling in one direction under load-bearing contact with and through said first spiral groove (5-1) of said double thread screw track (5) and then in the opposite direction under substantial non-load contact relation with and through said second spiral groove (5-2) for returning the balls to said first spiral groove (5-1).

2) The ball bearing as stated in the above 1), wherein said ball-reversing U-turn groove (C) connecting the adjacent parallel spiral grooves (3-1, 3-2) at the opposing ends of said endless spiral groove track (E) for circulating the balls within the outer sleeve 1 is formed on one side of a plate-like plug member (6), a pair of such plug members (6-1) (6-2) are detachably attached onto openings that are provided at the longitudinally opposing end portions of said outer sleeve member (1), thereby connecting the adjacent spiral grooves (3-1, 3-2) with each other, while said pair of plug members (6-1) (6-2) are located on the peripheral surface of the outer sleeve (1) on the opposite sides relative to the longitudinal axis thereof.

BRIEF DESCRIPTION OF THE DRAWINGS

In order that the present invention will be more clearly understood, it will now be disclosed in greater detail with reference to the accompanying drawings, wherein FIGS. 3 to 5 are given, as referential drawings, illustrating the prior art ball bearing of Japanese Patent Application Disclosure No. 57956-1988, of which the present invention is an improvement, wherein FIG. 3 is a partial cross-sectional elevation, FIG. 4 is a longitudinal section taken along line IV—IV on FIG. 3, and FIG. 5 is a cross section taken along line V—V on FIG. 3.

DESCRIPTION OF THE PREFERRED EMBODIMENT

Figure 1:
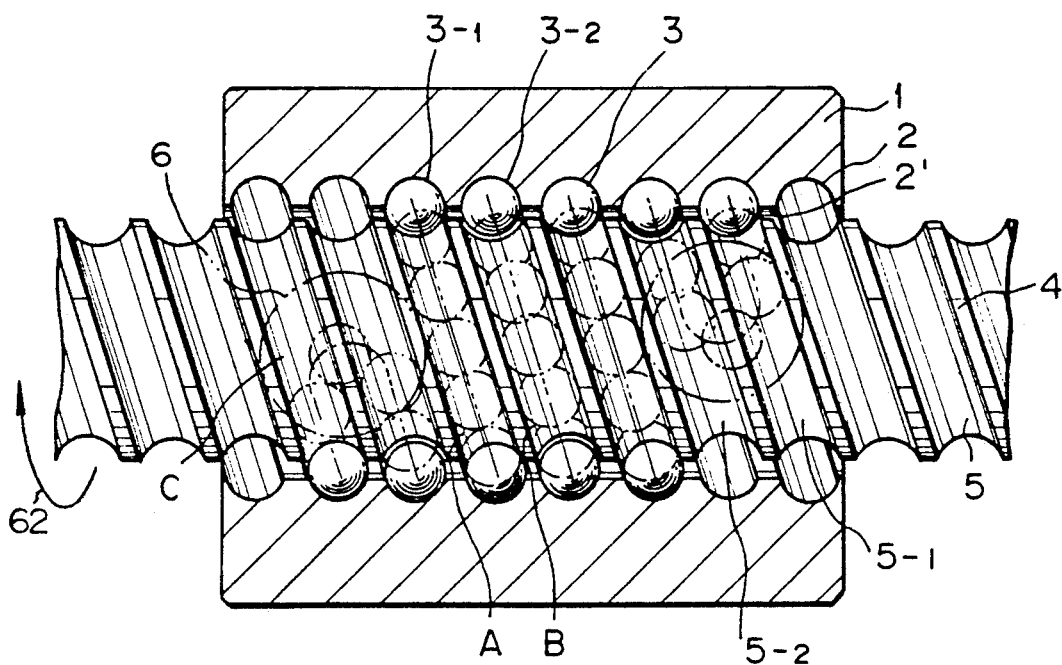
FIG. 1 is a partially sectional elevation of the present ball bearing, wherein an outer sleeve member is shown in a longitudinal section, into which is inserted an elongated rod-like insert member with a plurality of balls being circulated on and through a double thread screw track provided thereon.
Figure 3:
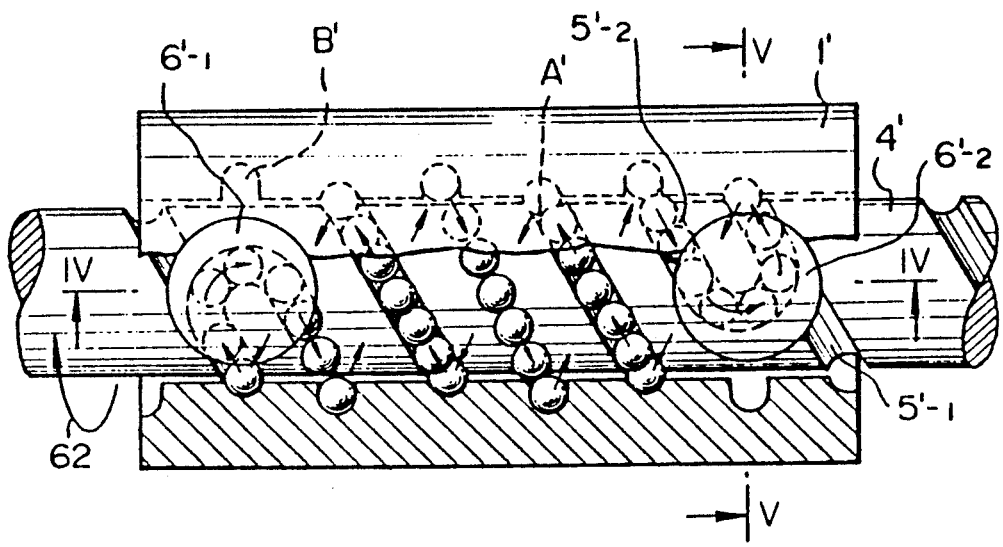

Referring now to the drawings, and more particularly to FIG. 1, illustrating the basic construction of the present ball bearing, it consists, like the above-mentioned prior ball bearing, of an elongated rod-like insert member 4 and an outer sleeve member 1 having the shape of an elongated cylinder for receiving it within its throughbore 2' having a circular cross section and extending longitudinally through the whole length of said outer sleeve member 1. As illustrated in FIG. 1 (the present invention) and FIG. 3 (the prior ball bearing), a ball circulating track is formed on the interface between the outer sleeve member 1 and the rod-like insert member 4 and it traces a locus that is obtained with a loop of strap in the form of an elongated ellipse having an extremely greater ratio of the longer diameter with the shorter diameter, wound around an elongated rod having a circular cross section from one end to the other with the same pitch so as to form a double thread screw track consisting of a first groove part spirally extending in one direction and a second groove part spirally wound back in the opposite direction.

According to the prior art ball bearing, the adjacent parallel spiral grooves (5'-1, 5'-2) of a double thread screw track to be formed on the peripheral surface of the rod-like insert member 4' has the same cross-sectional depth but according to the feature of the present invention, a double thread screw track to be provided on the rod-like insert member 4 includes adjacent parallel spiral grooves consisting of a first spiral groove (5-1) with a shallower depth in cross section, to form a load-bearing ball track, and a second spiral groove (5-2) with a deeper depth in cross section, to form a non-load ball return track (B), while a double thread screw track to be formed on the innerwall surface of the throughbore 2' of the outer sleeve 1 consists also of adjacent parallel spiral grooves having the same cross-sectional depth so that the balls traveling therethrough the non-load ball return track (B) are prevented from substantially contacting with the groove surfaces.

As having been disclosed in Japanese Patent Application Disclosure No. 57956-1988, the non-load spiral ball return passage (B') having a deeper cross-sectional depth is formed on the innerwall surface of the outer sleeve 1' in parallel with the load-bearing spiral groove (A') having a shallower cross-sectional depth, while on the rod-like insert member 4' is formed a double thread screw track consisting of grooves (5'-1, 5'-2) having the same cross-sectional shape and depth.

According to the present invention as constructed above, an elongated rod-like insert member 4 having a circular cross section is inserted into a circular throughbore 2' formed in a cylindrical outer sleeve member 1 with a plurality of balls being intervened on the interface between the two members, more concretely within an endless spiral groove track formed between the mating load-bearing spiral ball tracks (A) and the mating adjacent non-load spiral ball return passages (B) of the two members 1 and 4 respectively so as to allow a smooth linear sliding movement thereof in the axial direction.

The elongated rod-like insert member 4 according to the present invention has a double thread screw groove track 5 with any desired pitch that may be selected depending on the length and size of the insert member employed and the number of balls used. In this connection, the corresponding double thread screw groove track 3 to be provided on the innerwall surface of the throughbore 2' of the outer sleeve member 1 may also be formed similarly.

It should be noted that the double thread screw groove track 3 of the outer sleeve member 1 must form an endless groove loop track for circulating balls, due to the presence of a ball-reversing U-turn groove (C) connecting the adjacent parallel spiral grooves (3-1, 3-2) located at the opposite ends of the double thread screw groove track (3).

Figure 2:
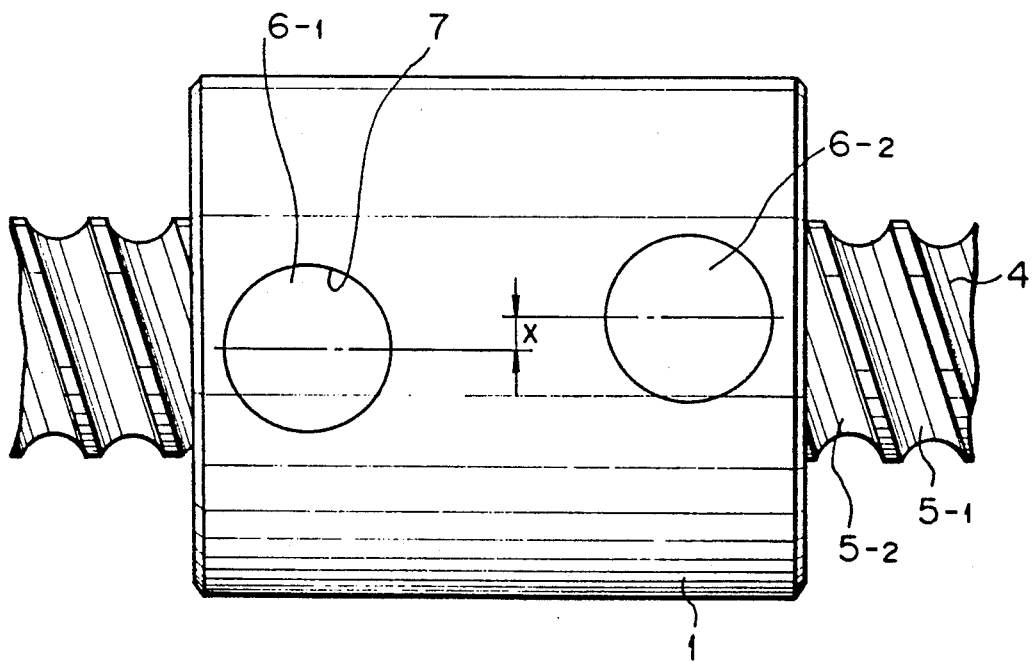
FIG. 2 is an elevation of one of the embodiments of the present ball bearing, showing a pair of plate-like plugs positioned in horizontally non-aligned relation on the outer sleeve member.
Figure 5:
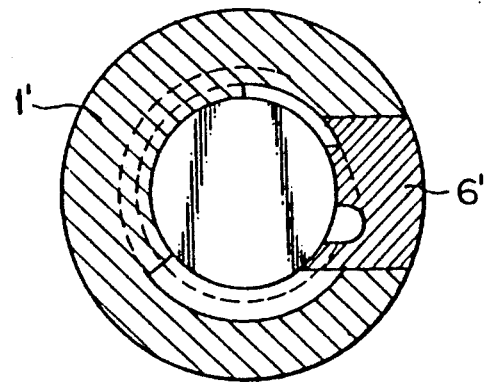

Such a ball-reversing U-turn groove (C) capable of forming an endless ball circulating track according to the present invention may be in the shape of a circular plate-like plug 6 as shown in FIG. 2 (in FIG. 5, the reference numeral 6' according to the prior bearing), with a U-turn groove (C) being formed on one side and a smooth surface on the other side conforming to the peripheral surface of the outer sleeve 1.

The structure of such a plug is not within the technical scope of the present invention as it is described in detail in the above-mentioned prior art publication.

Figure 4:
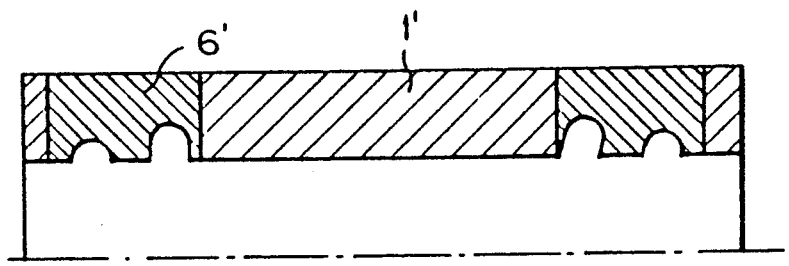

It is also a conventional technique that such a plug is threadably fastened into an opening provided each at the opposite end parts of the outer sleeve 1 (FIGS. 2 and 3) and further, a pair of such plugs (6-1, 6-2 in FIG. 2 and 6'-1, 6'-2 in FIGS. 3 and 4) are arranged either in an aligned relation with the longitudinal axis of the outer sleeve or on the opposite sides relative to said axis so as to prevent the mechanical strength of the outer sleeve 1 deteriorating thereby.

Referring to FIG. 2, a pair of ball-reversing U-turn plugs (6-1, 6-2) are located a distance of X apart from each other in relation with a horizontal line on the sleeve 1 in parallel with the longitudinal axis thereof.

In the following, the operation of the present ball bearing in relation with ball circulation will be explained:

Referring to FIG. 1, when the elongated rod-like insert member 4 rotates in the indicated arrow direction 62, the loaded balls travel on and through the load-bearing track (A) formed between the insert-side spiral groove 5-1 and the mating sleeve-side spiral groove 3-1 until they reach the left-hand end region of the outer sleeve 1, where is provided a ball-reversing U-turn groove (C), the traveling balls are then gradually scooped and guided back into the adjoining non-load track (B) that is formed between the insert-side spiral groove 5-2 and the mating sleeve-side spiral groove 3-2. The thus U-turned balls are thus guided through the non-load track (B), without making any substantial loaded contact with the spirally extending grooves, since the non-load track groove (B) has a cross-sectional depth sufficient to guide loosely the balls therethrough. Upon the balls guided through the non-load track (B) have reached the end of the track where another ball-reversing U-turn groove (C) is connected, they are gradually scooped and guided back into the load-bearing track (A) that is formed between the first spiral groove (5-1) of the rod-like insert member 4 and the mating load-bearing spiral groove (3-1), viz., loaded ball track (A) of the outer sleeve 1, so that the bearing balls are circulated through the endless double thread screw groove track formed on the interface between the two members, effecting a smooth and less-resisting linear movement of the former relative to the latter.

Referring now to FIG. 2, illustrating an embodiment where the U-turn groove plugs are arranged on the opposite sides by a distance X relative to the longitudinal axis of the outer sleeve 1, if the distance X is varied in this particular embodiment, the number of groove turns formed on the throughbore surface of the outer sleeve member 1 will also vary, therefore the distance X may be desirably selected to obtain a desired number of the groove turns.

Having been constructed as fully described above, according to the present invention, the double thread screw groove track to be formed on the inner wall surface of the throughbore 2' of the outer sleeve member 1 can be formed with the same cross section so that unlike the prior art ball bearing disclosed by Japanese Patent Application Disclosure No. 57956-1988, an outer sleeve member can be obtained with high dimensional precision and excellent surface working.

On the other hand, a load-bearing track (A) having a shallower cross-sectional depth and a non-load bearing track (B) having a deeper cross-sectional depth may be formed as adjacent parallel spiral grooves of a double thread screw track on the outwardly easily accessible, peripheral surface of an elongated rod-like member 4, therefore, only a very simple and accurate working is required in the manufacture as compared with the above-mentioned prior bearing essentially requiring a very difficult working on the hard-to-accessible inner-wall surface of a cylindrical body in the formation of such a complicated double thread screw track consisting of adjacent spiral grooves having different cross-sectional depths. As mentioned above, the present invention is very useful in the manufacture of a high performance linear motion ball bearing unit at a low cost yet with high precision.

What is claimed is:

1. A ball bearing for effecting endless linear motion comprising an elongated rod-like insert member (4) and an outer sleeve member (1) for receiving, within its longitudinally extending through bore (2'), said elongated rod-like insert member (4), and a plurality of balls intervened between said elongated rod-like insert member (4) and said outer sleeve member (1) for allowing said two members to effect a free relative linear motion along their longitudinal axes, which is characterized in that said rod-like insert member (4) is provided, on and around its peripheral surface, with a double thread screw track (5) having the same pitch and consisting of a first spiral groove (5-1) having a shallower depth to form a load-bearing ball track and a second spiral groove (5-2) adjacent said first spiral groove (5-1) and having a cross section similar to that of said first spiral groove but having a deeper cross-sectional depth to form a non-load ball return passage, said outer sleeve member (1) has, on the inner surface of its longitudinally extending throughbore (2'), a double thread screw track (3) consisting of adjacent parallel, spiral grooves (3-1) (3-2) having the same cross section with the same depth and adapted to mate with the double thread screw track (5) of said rod-like insert member (4) with ball-reversing U-turn grooves (C) connecting the adjacent parallel spiral grooves (3-1) (3-2) at opposing ends of said double thread screw track (3), said U-turn grooves being formed on plug-like members (6-1) (6-2) removably attached in openings at the longitudinally opposing end portions of said outer sleeve member (1), the center of one of said plug members being displaced a predetermined distance (X) from a line parallel to the longitudinal axis of said outer sleeve member extending through the center of the other of said plug members, the predetermined distance (X) being substantially less than one half the outer sleeve member circumference, thereby forming an endless spiral groove track (E) for circulating the balls, and that while said outer sleeve member (1) and said rod-like insert member (4) are making a relative linear motion each other, the balls are being circulated through said endless spiral groove track (E), traveling in one direction under load-bearing contact with and through said first spiral groove (5-1) of said double thread screw track (5) and then in the opposite direction under substantial non-load contact relation with and through said second spiral groove (5-2) for returning the balls to said first spiral groove (5-1).

2. A bearing for effecting endless linear motion comprising:

an insert member;

an outer sleeve member;

a plurality of balls adapted to be carried between said insert member and said outer sleeve member, said insert member having on its peripheral surface a first double thread screw track for carrying said balls, said first track comprising a first spiral groove and a second spiral groove adjacent said first spiral groove, said first spiral groove having a shallower depth than said second spiral groove;

said outer sleeve member having on its inner surface a second double thread screw track for carrying said balls, said second track comprising two spiral grooves;

said two spiral grooves in said outer sleeve member being adapted to mate with said first spiral groove and said second spiral groove in said insert member and to hold said balls therebetween; and two longitudinally spaced-apart plugs extending to the inner surface of said outer sleeve member for changing the path of said plurality of balls between said first spiral groove and said second spiral groove, the center of one of said plugs being displaced a predetermined distance from a line parallel to the longitudinal axis of said outer sleeve member extending through the center of the other of said plugs, the predetermined distance being substantially less than one half the outer sleeve member circumference;

whereby said balls are load bearing when carried in said first spiral groove and are non-load bearing when carried in said second spiral groove.

* * * * *